April 2, 1929.  J. H. WALCOTT  1,707,776
INSTRUMENT FOR MEASURING THE MEAN THICKNESS OF SHEET MATERIALS
Filed Nov. 10, 1922  2 Sheets-Sheet 1
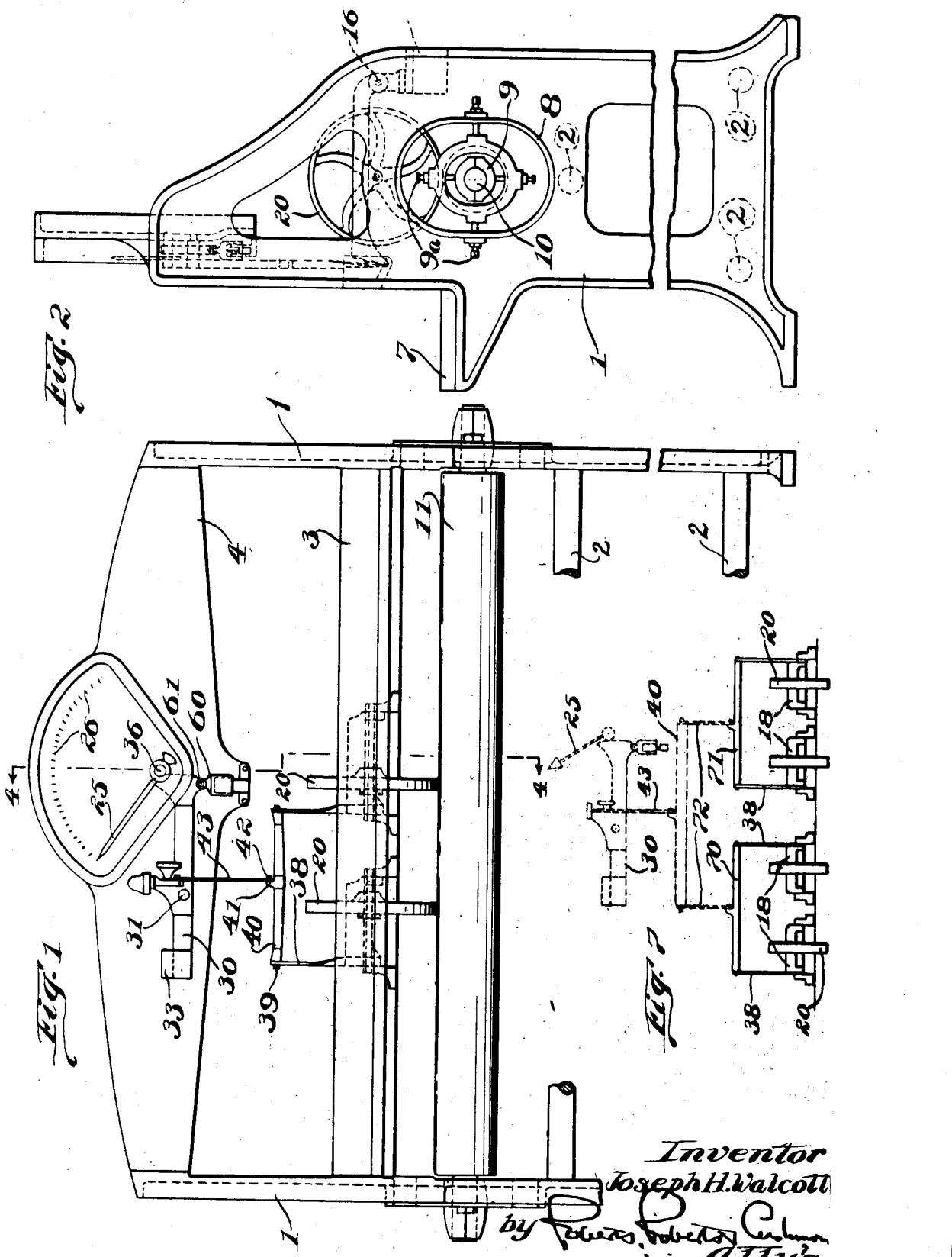
Inventor
Joseph H. Walcott
by Roberts, Roberts Cushman
his Atty's.

April 2, 1929.  J. H. WALCOTT  1,707,776
INSTRUMENT FOR MEASURING THE MEAN THICKNESS OF SHEET MATERIALS
Filed Nov. 10, 1922  2 Sheets-Sheet 2
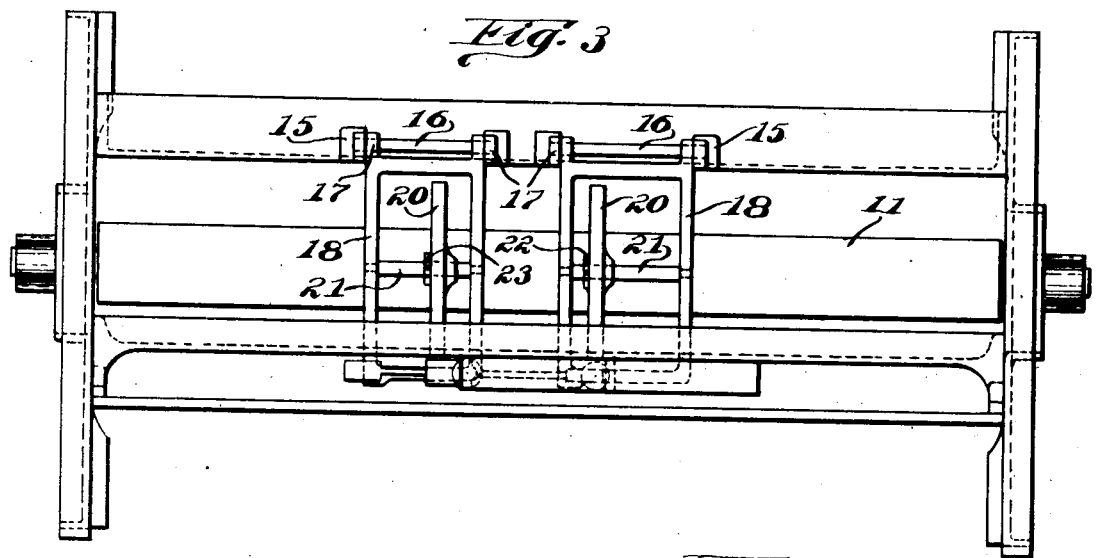
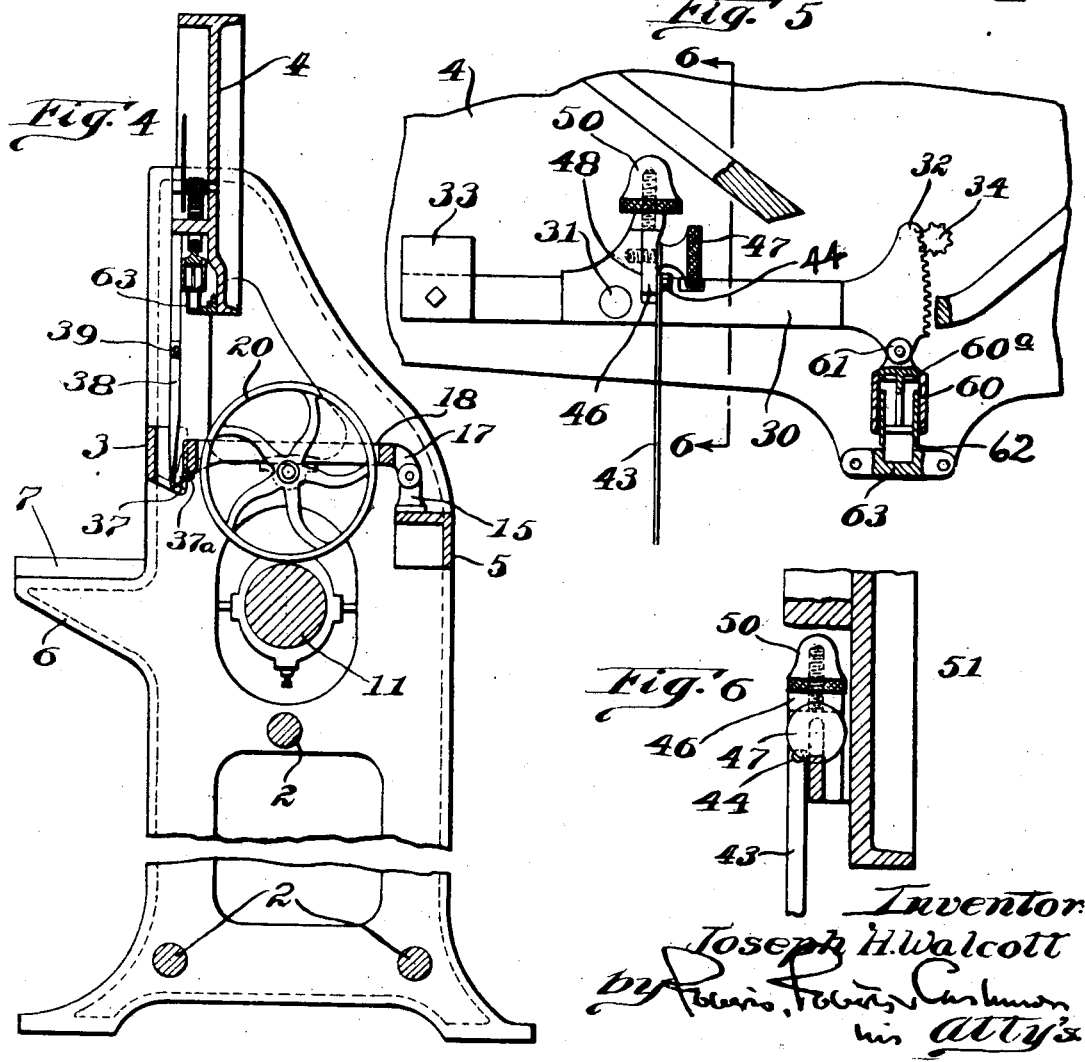
Inventor
Joseph H. Walcott Patented Apr. 2, 1929.

1,707,776

UNITED STATES PATENT OFFICE.

JOSEPH H. WALCOTT, OF SALEM, MASSACHUSETTS, ASSIGNOR, BY MESNE ASSIGNMENTS, TO HARDING-WALCOTT COMPANY, OF BOSTON, MASSACHUSETTS, A CORPORATION OF MASSACHUSETTS.

INSTRUMENT FOR MEASURING THE MEAN THICKNESS OF SHEET MATERIALS.

Application filed November 10, 1922. Serial No. 600,031.

This invention relates to machines for determining the mean thickness of sheet materials of variable thickness, such as strips of leather. A principal use for such machines is in grading leather, hides and skins.

The mean thickness of such strips has heretofore been determined by inspection, by weight, and by calipering measurement. In the case of smaller pieces of leather such as cut soles, it has been heretofore proposed to concurrently measure the thickness at several places, and to grade the sole by determination of its minimum thickness; and I am aware of devices in the prior art for so measuring and marking such pieces of leather, for cutting them to an even thickness, for the purpose of making them uniform; for measuring the area; and for performing numerous other mensuration operations in respect to leather. But I am not aware of a commercial machine adapted to show with accuracy the mean thickness of skin, a side, or a strip of sole leather. Such a machine is useful to leather merchants and buyers, and may be employed for the primary determination of the classification and value of large quantities of leather. Accuracy and convenience are prime essentials in a measuring machine for these purposes.

Objects of this invention are therefore to provide a machine characterized by simplicity, convenience, accuracy, readiness of adjustment, and capacity for rapid use, for the purpose of determining the mean thickness of hides, leather, skins, or other materials, or of strips of these materials fed through the machine by hand or mechanically.

In order to accomplish these objects, I have devised a machine including improved devices for supporting the material to be measured, for detecting the thickness of the material between the support and a plurality of measuring detectors, and for integrating the indications of the measuring detectors and displaying the integrated or average value of the indication found by the detectors.

In order to explain the invention I have herein shown particular instances of the devices making up a specific machine corresponding to the invention.

In the accompanying drawings:

Fig. 1 is a front elevation partly broken away showing a preferred type of the machine;

Fig. 2 is a side elevation;

Fig. 3 is a view in plan;

Fig. 4 is a section on the line 4—4 of Fig. 1;

Fig. 5 is an enlarged detail elevation of certain connections to the measuring dial partly broken away;

Fig. 6 is a detail section on the line 6—6 of Fig. 5; and

Fig. 7 is a diagram corresponding to Fig. 1 showing a modification.

Referring now to Figs. 1 and 2 the machine comprises a suitable erect frame, which may consist of the end-standards 1 and rigid longitudinal struts 2, 3, 4 and 5, (Fig. 4) of which the struts 2 may be solid or tubular round bars, the struts 3 and 4 may be of sufficient vertical depth to resist racking stresses, and strut 5 may be of a section adapted to give fore and aft as well as vertical stiffness to the frame. Preferably this frame is provided with forward projections 6 to support a feed table 7. In the end frames 1 in suitable openings surrounded by stiffening webs 8 bearings 9, preferably of the gimbal type shown and adapted to be adjusted in two dimensions by screws 9ª, are provided for the reduced ends 10 of a relatively wide cylindrical roll 11 which is adapted to serve as a rotating abutment upon which the material to be measured is received and in respect to which its thickness is measured. Roll 11 may be driven by any suitable driving connection, but it is not essential to drive it except by the material moved through the machine by the operator.

The thickness of the class of materials in question, which are compressible, should be measured under a known and constant compression, preferably light enough to avoid at all indenting the material by the measuring instrument. Where the purpose, as here, is to indicate the mean or average thickness, I have found by experience that a sufficient and reliable measurement is to be obtained by determining the average thicknesses along two longitudinal lines near and arbitrarily spaced from the center line of the piece of material to be measured.

In order to provide the machine with measuring devices of the capacities and in the places indicated above, I prefer to mount, for example on the strut 5, (Figs. 3 and 4) bearing brackets 15 in which are mounted stationary shafts 16.

Upon the respective shafts measuring devices or detectors are mounted, such detectors comprising frames 18 provided with bored lugs 17 which are journaled to turn freely on the respective shafts. In spaced journal blocks on each frame a shaft 21 is journaled and a relatively large material abutment member or feeler wheel is adjustably secured to each shaft. These wheels preferably have split hubs 22 and pinch screws 23 permitting them to be positioned and firmly secured at any desired point along the length of their respective shafts 21. It will be understood that frames 18 are independent of each other, and independently rise and fall to positions determined by the thickness of the material between the wheels 20 and the roll 11.

In order to determine and indicate the mean thickness of the material, the invention provides means for displacing an index hand or pointer 25, Fig. 1, in respect to a dial scale 26 in accordance with the mean or average displacement of the wheels 20 and the frames 18. Preferred means for this purpose comprises, (see Figs. 1 and 5), a connection including an indicator lever 30 pivoted on a stationary stud shaft 31 projecting from the upper frame member 4, and having at one end a gear sector 32 and at the other end an adjustable counterweight 33. Sector 32 meshes with a pinion 34 integral with or attached to a shaft 36 upon which the index 25 is fastened.

In order to transmit the movement of the frames 18 to the lever 30, the forward ends of the frames 18 are severally provided with lugs 37 (Fig. 4). The lower ends of thin, transversely flexible elongate metallic strips 38 are bent around the under sides of the lugs 37 and secured thereto by screws 37ª. These strips have holes at their upper ends engaging screws 39 and the respective ends of an equalizer lever 40, best shown in Fig. 1, which lever 40 is in turn suspended by a central lug 41 having therein a screw 42 passing through a hole in a flexible metallic strap 43, which in turn is supported at its upper end by a screw 44 threaded into a slide block 46. The lever 40 is fixedly secured to the flexible members 38 and 43 and the latter is likewise secured to lever 30, the resiliency of members 38 and 43 permitting the usual knife edge fulcrums to be dispensed with, thus eliminating all possibility of looseness or backlash. This slide block 46 is centrally slotted to receive the shank of a clamping thumb screw 47 tapped into a hole in the lever 30, and slides on a vertical face 48 of the lever 30. The vertical position of the slide 46 may be adjusted by a thumb nut 50 engaging a screw-threaded extension of the slide block 46. The vertical position of the slide block 46 is adjusted by turning the screw 50, and the block 46 is clamped in this adjustment by setting up the thumb screw 47.

Ordinarily the counterweight 33 is so set as to hold the wheels 20 suspended a very slight distance above the roll with the index 25 at the 0 of the scale, this setting of the wheels 20 facilitating entrance of the material between them and the roll. The means employed for supporting the wheel 20, comprising the flexible but substantially inextensible tension members 43 and 38 and the lever 40 serves to transmit the most minute movements of the wheels to the lever 30 with the utmost precision as no pivotal or other loose connections are employed such as might develop wear or backlash, while the members 43 and 38, although capable of transverse flexure to care for abnormal variations in the thickness of the material are normally substantially inextensible. The frames 18 are of sufficient width to permit a considerable change in the position of the wheels 20 upon their respective shafts so that the thickness measurement of the material may be made at optionally variable distances from its longitudinal center line, which is desirable in dealing with different grades and varieties of material. If either of wheels 20 is lifted the point of attachment of the connection 43 to the lever 40 is elevated by one-half the displacement of said wheel. If both wheels 20 are elevated, the corresponding elevation of the lever 30 is the average or mean of the respective elevations.

If now a piece of material is moved through the machine over the roll 11 and under the wheel 20, index 25 will be displaced in conformity with the average or integrated thickness measured by the wheels 20. As the diameter of the wheel 20 is large and its rim wide, it bears upon a considerable extent of surface of the material and thus is self integrating for areas of the order of a square inch or more so that variations in thickness of but slight linear extent do not necessarily occasion rapid vibration of the detector wheel. If variations in thickness of considerable linear extent occur with considerable frequency, the index 25 may move too rapidly, and as this is not desirable, I may arrange the machine so as not to respond to rapid motions of the wheels 20 by damping the vibrations of index 25. One preferred way of doing this is to provide an oscillating-cylinder oil dash pot having a piston 60ª (Fig. 5) and cover 60 pivoted at 61 to the lever 30, and cooperating with a cylinder 62 fastened to a bracket 63 of the frame member 4 and filled with a viscous oil. The flexible connections 38, 43 yield by transverse flexure upon upward movement of the frames 18, unless this movement is made at a rate permitted by the escape of air from the dash pot 60, 62.

In operation, strips of leather or other material run through the machine by an operator standing in front of the table 7 cause oscillations of the index 25 between limits readily observable by the operator. The mean or average thickness so indicated determines the classification of the material being measured.

While the described means for measurement, averaging and indicating the thickness at two longitudinal regions only of the material is preferred and generally sufficient, it will be understood that the principle of the invention is applicable to any desired number of primary measurements simultaneously made and continuously averaged by the indicator element of the machine. For example, Fig. 7 shows an arrangement by which the indicator lever 30 is actuated by the averaged or integrated indications of four discs 20 and four independent gravity frames 18, the left hand pair and the right hand pair severally of the frames 18 being connected to additional equalizer levers 70 and 71 by connections 38, and the levers 70 and 71 being connected by flexible straps 72 to the equalizer lever 40, as above described.

In each instance, the preferred flexible connections 38, 43, 72 are thin steel tapes, spring tempered, such as are of familiar use for measuring tapes and clock-springs. These tapes should, of course, be sufficiently stiff positively to transmit any ordinary movement of the frames to the index lever without flexing and without extension or contraction in length. These elements, however, should be adapted to flex under abnormal movement of the frame such as might be produced by the passage or a fold in the leather or some other unusually thick part. The readiness with which zero adjustments for the pointer 25 can be made prevents any necessity for providing corrections for temperature.

I claim:

1. An instrument for detecting and indicating the mean thickness of sheet material comprising a plurality of measuring devices adapted to detect thickness at separated points by their bodily displacement, said devices being relatively adjustable to vary the distance between the points at which the thickness is to be detected, an index device, an equalizer lever, connections between said measuring devices and said equalizer lever and between the index device and the equalizer lever adapted to cause the index to be displaced in accordance with the mean bodily displacement of the said measuring devices, and means normally maintaining all of said connections under tension.

2. A machine for detecting and indicating the thickness of sheet materials comprising a support for the material to be measured, a plurality of detector wheels, means supporting said wheels for adjustment toward and from each other and also for bodily movement relatively to one another toward and from said support, an index, a two armed lever, a gear sector on one end of the lever, a pinion secured to the index and meshing with the sector, a counter-weight upon the other arm of the lever, and connections for transmitting bodily movement from the several detector wheels to the lever, the counter-weight being so arranged as normally to maintain said connections under tension.

3. In a measuring machine the combination with a roller abutment, of a plurality of bodily displaceable thickness detectors adapted to indicate the thickness of material passing over said abutment and comprising vertically movable frames each having thereon a roller for contact with the material resting upon said roller abutment, in combination with an index, and elongate transversely flexible tensioned connections adapted to transmit to the index upward displacement of said frames.

4. A machine for detecting and measuring the thickness of sheet material comprising a rotary support for the material to be measured, a plurality of frames each mounted to swing about an axis substantially parallel to that of the support, a detector wheel journalled upon each frame, the several wheels thus being bodily movable toward and from the support, an index pointer, a pinion secured thereto, a lever having a gear segment meshing with the pinion, and jointless connections for transmitting movement from the several detector wheel frames to the lever.

5. A machine for detecting and measuring the thickness of material comprising a work support, an index, an indicator lever, means for transmitting movement from the indicator lever to the index, a rockable equalizer suspended from the indicator lever, a pair of bodily movable detector wheels arranged to move bodily toward and from the work support, a movable frame supporting each wheel, and means for transmitting movement of the respective frames to points of the equalizer disposed upon opposite sides of the fulcrum of the latter, said transmitting means being normally under tension and constructed and arranged to transmit movement of the frames in one direction at least without appreciable change in magnitude.

6. A machine for detecting and indicating the thickness of sheet material comprising a pair of detector devices each comprising a movable frame, a freely rotatable detector wheel carried by each frame, an index, and means for transmitting motion from the several wheels to the index, said means comprising an equalizer lever and connecting elements rigidly united at their respective ends to the equalizer lever and to the respective frames.

7. An instrument for detecting and indicating the mean thickness of sheet material comprising a plurality of measuring devices adapted to detect thickness at separated points by their displacement, an index device, and connections including transversely flexible resilient members interposed between the index device and the measuring devices adapted to cause the index device to be displaced in accordance with the mean displacement of the said measuring devices.

8. An instrument for detecting and indicating the mean thickness of sheet material having therein an abutment adapted to contact with one surface of material passed over it, a plurality of measuring devices movable relatively to each other toward and from the material, said devices being normally supported severally to rest on the other surface of the material opposite to the said abutment, in combination with movable index means, and means including transversely flexible tension members for connecting the index means to said measuring devices.

9. An instrument for detecting and indicating the mean thickness of sheet material comprising an abutment adapted to contact with one surface of material passed over it, a plurality of measuring devices adjustable relatively to each other to vary their lateral spacing, said devices severally resting upon the other surface of the material opposite to the said abutment, in combination with movable index means, and means for causing the index means to be displaced in accordance with the mean displacement of said measuring devices, comprising index operating means, an equalizer device, and transversely flexible resilient elongate tension members connecting the index operating means and the measuring devices respectively to the equalizer device.

10. An instrument for detecting and indicating the mean thickness of sheet material having a plurality of detector devices each comprising a movable member, a movable index, means tending to retain the index in one position, and connections comprising a tension member fixedly secured to each of said movable members, an equalizer device having a part adapted to be displaced by motion of said members in accordance with the mean displacement of said detector devices, and a flexible resilient tension member fixedly secured to the equalizer device and arranged to transmit movement from the equalizer device to the index in opposition to the means tending to retain the latter in one position.

11. An instrument for detecting and indicating the mean thickness of sheet material comprising an abutment roller and a plurality of displaceable measuring devices spaced longitudinally relatively to the roller, a movable index, means tending to retain said index in one position, and connections between the measuring devices and the index comprising an equalizer device, substantially inextensible resilient tension members connecting the several measuring devices with the equalizer, and a substantially inextensible resilient tension member for transmitting movement from the equalizer device to the index.

12. In an instrument for detecting and indicating the thickness of sheet materials, the combination of a displaceable thickness detector with a movable index, an operating device for the index, and means for positioning the index in accordance with the displacement of said detector comprising a transversely flexible resilient tension connection between the detector and the operating device for the index, said operating device tending to return the index to one extreme of its path of motion and supporting the weight of the detector by means of said connection.

13. In an instrument for detecting and indicating the thickness of sheet materials, the combination of a displaceable thickness detector with a movable index and operating means for positioning the index in accordance with the displacements of said detector comprising a flexible resilient tension connection interposed between the detecting and the operating means for the index, said operating means tending to return the index to one extreme of its path of motion and supporting the weight of the detector by means of the tension connection, and means to adjust said index to zero position.

14. A measuring machine comprising a movable index, a pair of independently movable measuring devices, and connections between the index and measuring devices comprising an elongate substantially inextensible flexible member having connection at one end with the index, an equalizer lever fixedly secured to the opposite end of the flexible member, and elongate substantially inextensible flexible members connecting the measuring devices with the opposite ends of the equalizer lever, respectively, 15. A measuring machine comprising a lever provided with index operating means adjacent to one end and an adjustable counterweight adjacent to the other, damping means operative directly upon the first named end of the lever to prevent excess rapidity of movement of the index, a flexible resilient strip normally fixedly secured to said lever, an equalizer lever fixedly secured at its central part to the lower end of the flexible strip, a pair of measuring detectors, and resilient substantially inextensible members for transmitting movement from the respective detectors to the opposite ends of the equalizer lever.

16. An instrument for detecting and indicating the mean thickness of sheet material comprising a pair of contact wheels mounted respectively upon independent elongate shafts, means permitting independent adjustment of each wheel longitudinally of its shaft, a pair of swinging frames having spaced journals respectively for said shafts, an index device, an equalizer lever, connections between the respective frames and the opposite ends of the lever, and connections between the equalizer lever and the index device arranged to cause the index device to be displaced in accordance with the mean displacement of the contact wheels.

17. A machine for detecting and measuring the thickness of material comprising a work support, an index, an indicator lever, means for transmitting movement from the indicator lever to the index, a rockable primary equalizer suspended from the indicator lever, two pairs of bodily movable detector wheels arranged to move toward and from the work support, a movable frame supporting each wheel, a secondary equalizer lever for each pair of frames, means transmitting movement of the respective frames of each pair to the opposite ends of the corresponding secondary equalizer levers, and means for transmitting bodily movement of the respective secondary equalizer levers to points of the primary equalizer disposed upon opposite sides of the fulcrum of the latter, all of said transmitting means being normally under tension and constructed and arranged to transmit movement in one direction at least without appreciable change in magnitude.

Signed by me at Salem, Massachusetts, this seventh day of November, 1922.

JOSEPH H. WALCOTT.